S. S. GOLDMAN.
TROLLEY AND SUPPORT THEREFOR.
APPLICATION FILED SEPT. 14, 1908.
931,292.
Patented Aug. 17, 1909.
2 SHEETS—SHEET 2.
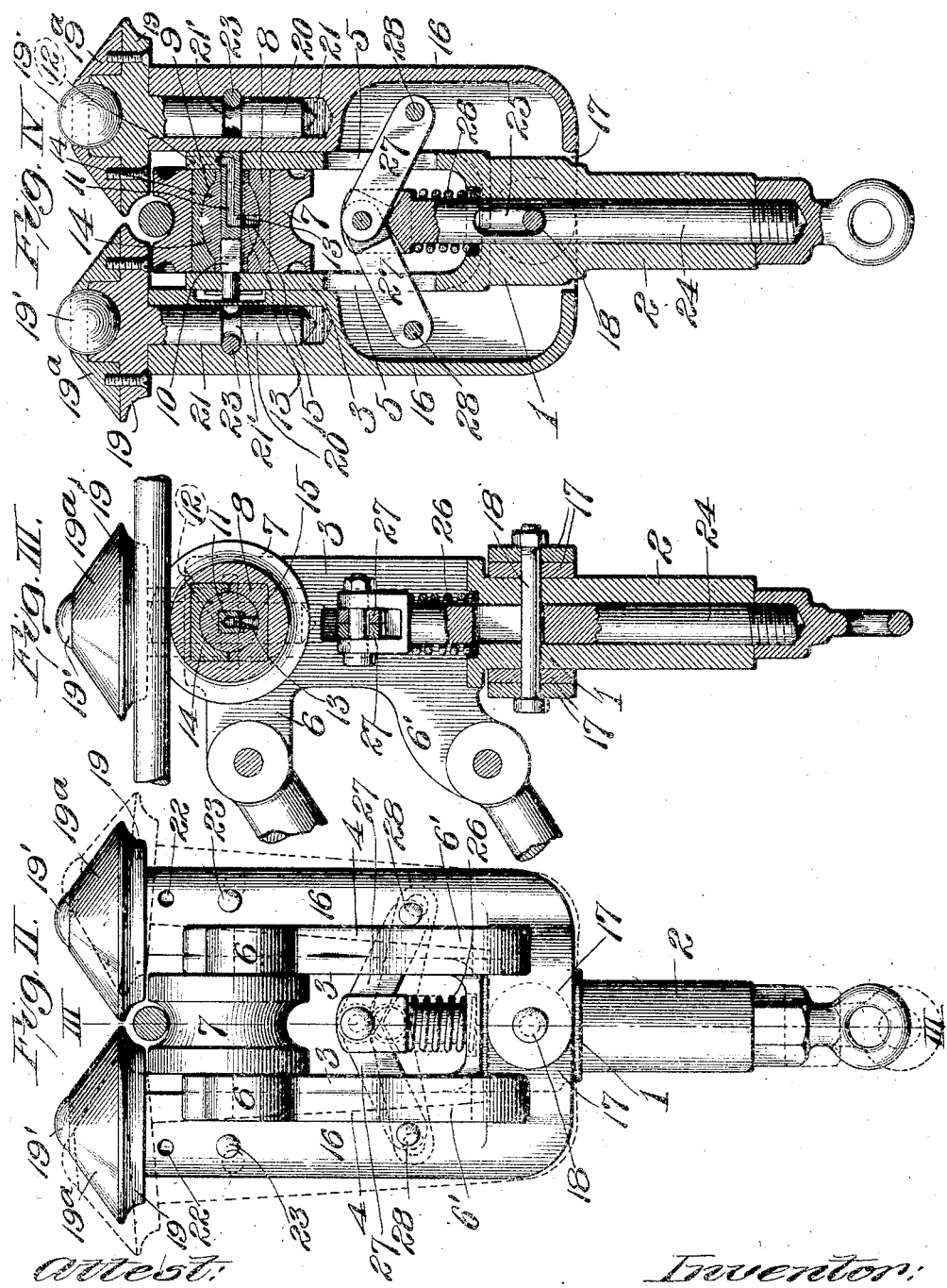

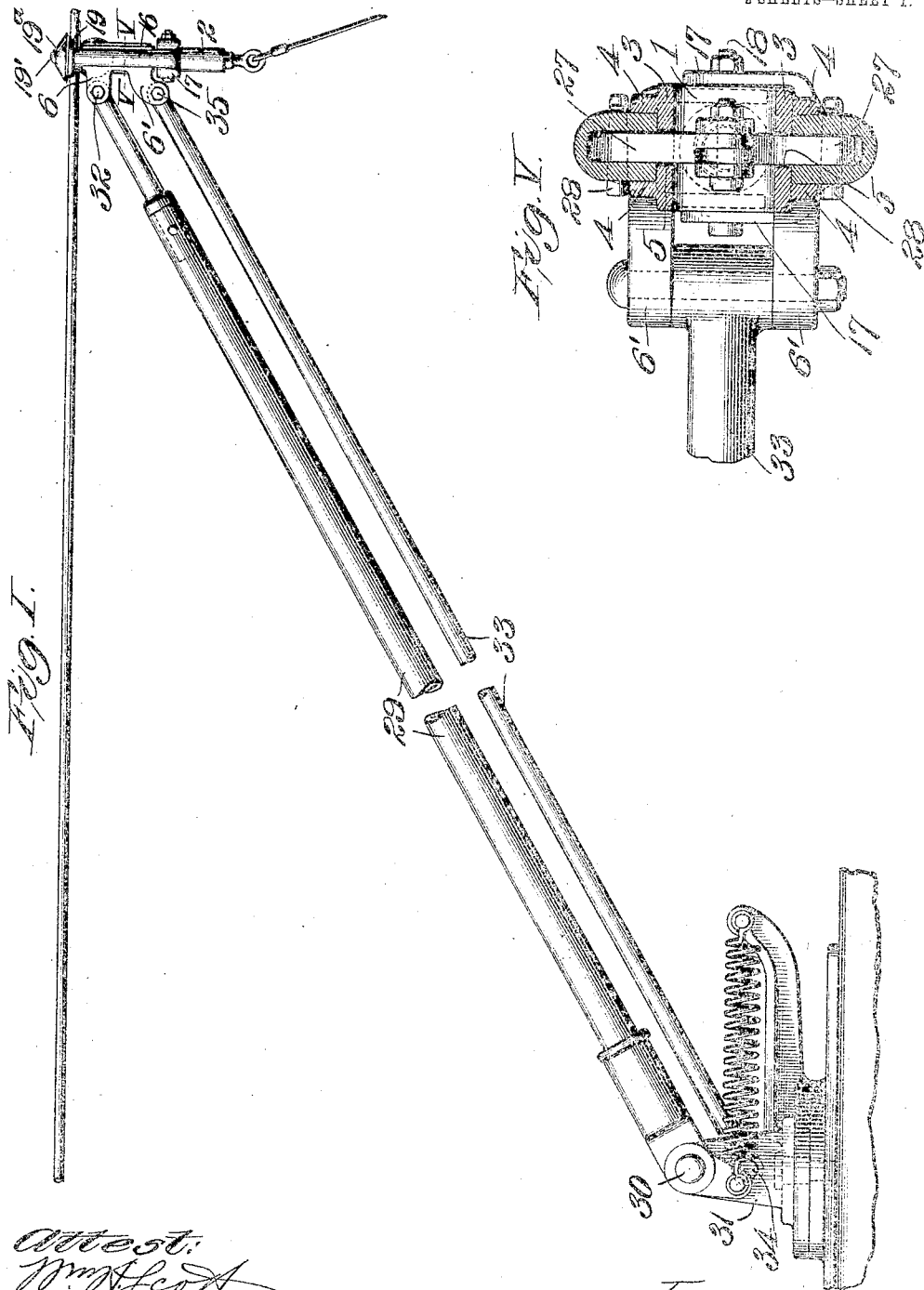

UNITED STATES PATENT OFFICE.

SAMUEL S. GOLDMAN, OF ST. LOUIS, MISSOURI, ASSIGNOR OF ONE-FOURTH TO CHARLES J. MALECEK, OF ST. LOUIS, MISSOURI.

TROLLEY AND SUPPORT THEREFOR.

No. 931,292.　　　　Specification of Letters Patent.　　　Patented Aug. 17, 1909.

Application filed September 14, 1908. Serial No. 452,888.

*To all whom it may concern:*

Be it known that I, SAMUEL S. GOLDMAN, a citizen of the United States of America, residing at the city of St. Louis, in the State of Missouri, have invented certain new and useful Improvements in Trolleys and Supports Therefor, of which the following is a full, clear, and exact description, reference being had to the accompanying drawings, forming part of this specification.

My invention relates to an improvement in trolleys and supports therefor for use upon electrically operated railways and it has for its object the production of a trolley of this description so constructed as to be maintained in an efficient manner in contact with a trolley wire against which it operates, notwithstanding the tendency of the trolley to become separated from the trolley wire, due to the variations in elevation of the wire at different points and other causes that tend to dislodge the trolley from the wire.

Figure I is an elevation of my trolley and its support. Fig. II is a front elevation of the trolley on a much larger scale. Fig. III is a vertical section taken on line III—III, Fig. II, through the trolley. Fig. IV is a vertical cross section through the trolley. Fig. V is an enlarged horizontal section taken through the trolley on line V—V, Fig. I.

In the accompanying drawings: 1 designates the harp of my trolley which is provided at its lower end with a hollow leg 2.

3 are the side arms of the harp that are provided at their outer faces with vertical flanges 4 that receive members to be hereinafter mentioned. In the lower portions of the side arms of the harp are vertical slots 5.

6 and 6' are superposed bracket arms that extend forwardly from the side arms of the harp and which serve to receive the pivotal connection of the trolley supporting means as will hereinafter appear.

7 designates the trolley wheel which is provided with a groove of half circle shape in cross section, is positioned between the side arms of the harp and is located at a line drawn vertically through the harp. This trolley wheel is provided with a journal box 8, see Figs. III and IV, preferably composed of sections and the interior journal face of which is concaved, as seen at 9, Fig. IV, for a purpose to be hereinafter explained.

10 is a shaft that is mounted in a fixed position in the side arms of the harp 1 so that it is incapable of rotation therein, the shaft being preferably of square or non-circular shape in cross section. This shaft is provided with an oil-duct 11 that extends longitudinally from one end of the shaft to its center and is open at the top of the shaft whereby it is placed in communication with an inlet duct 12 that extends downwardly from the top of the side arms 3 of the harp in which it is located. The oil duct 11 terminates in a downwardly extending portion 13 at the center of the shaft.

14 is a journal sleeve surrounding the shaft 11 and the exterior journal surface of which is of convex shape to fit into the concavity of the journal face 9 in the journal box 8. At the bottom of the journal sleeve 14 is an oil duct 15 that communicates with the oil duct 11 in the shaft 10 and through which lubricant introduced into said oil duct passes to constantly lubricate the journal faces of the journal box 8 and the journal sleeve 14 during the use of the trolley.

I desire to call particular attention to the fact that by making the journal box with a concaved journal face and the journal sleeve with a convex journal face I provide a pocket or basin within the journal box in which the lubricant is much more efficiently retained than it would be in the event of the use of a straight journal extending directly through the trolley wheel.

16 designates carrier posts provided at their lower ends with bifurcated arms 17 that straddle the leg 2 of the harp 1 and are united to said leg by a pivot pin or bolt 18, thereby providing a connection between said carrier posts and the harp that permits of the upper ends of the carrier posts being swung outwardly relative to the side arms of the harp, as indicated by dotted lines Fig. II. The carrier posts are adapted to fit when in their upright and unspread positions between the flanges 4 of the side arms of the harp, as seen in Figs. II and V.

19 designates guard wheels that are provided at their upper ends with conical faces and at their lower sides with grooves of quarter circle shape in cross section providing bearing faces which normally overhang the groove in the trolley wheel 7 immediately beneath said guard wheel thus forming a circular opening between the trolley and guard wheels. The guard wheels are provided with pivot stems 20 that are seated in pockets 21 extending downwardly in the carrier posts 16 from their upper ends and which, in addition to their service as journal pockets for said stems, also serve as lubricant wells for the stems into which lubricant may flow when introduced through oil holes 22 located at the upper ends of the carrier posts, see Fig. II. The pivot stems of the guard wheels 19 are provided with circumferential grooves 21′, see Fig. IV, that receive removable pins or keys 23 mounted in the carrier posts and seated in said grooves and whereby upward movement of said stems is resisted.

24 designates a pull rod slidably fitted in the leg 2 of the harp 1 and which is adapted to receive the connection of a pull cord that extends from the trolley to the car with which the trolley is used. The pull rod 24 is provided with a slot 25 that receives the pivot pin 18 by which the carrier posts 16 are united to the harp, thereby permitting longitudinal movement of the pull rod and causing said pin to prevent rotation of the rod. The pull rod is normally maintained in an elevated position by a lift spring 26 and it has pivoted to its upper end toggle links 27 which are pivotally connected at their outer ends to the carrier posts 16 by pins 28. The lift spring 26, by acting under normal conditions to hold the pull rod in an elevated position, causes the toggle links 27 to exert a constant inward pull upon the carrier posts 16, as a consequence of which said carrier posts are held against the side arms of the harp 1 and the guard wheels 19 are maintained in positions above the trolley wire to prevent the escape of the trolley from the wire. It will be seen that inasmuch as the guard wheels are located directly above the trolley wheel, the trolley is susceptible of partaking of a material downward or upward movement, due to variations in the elevation of the trolley wire at different points without liability of the trolley wire being forced between the guard wheels and that the guard wheels will serve, under all normal conditions, to prevent the escape of the trolley wheel from the trolley wire. When the trolley is to be fitted to the trolley wire or removed therefrom, it is only necessary to exert a downward pull upon the pull rod 24, whereby the toggle links 27 are caused to exert outward pressure against the carrier posts 16 to spread them apart and open a passageway between the guard wheels through which the trolley wire may pass.

In order that the guard wheels 19 of my trolley may ride beneath the overhanging portions of switches associated with trolley wires without frictional wear between the guard wheels and the switches, I supply each guard wheel with an anti-friction ball or roller 19′ that is seated in the top of the guard wheel and is held in place by a retaining plate 19ª suitably secured to the body of the wheel.

For the purpose of maintaining my trolley in an upright position at all times in order that the guard wheels will travel in a horizontal course above a trolley wire and without liability of upward pressure against the guard wheels obliquely to their axes to separate them, I employ a trolley support which consists of the following parts: 29 designates the trolley pole of said support, the lower end of which is pivoted at 30 to a base 31 that may be of any ordinary construction. The upper end of this trolley pole is pivoted at 32 to the upper bracket arm 6 carried by the side arm of the trolley harp 1. 33 is an alining rod, the lower end of which is pivoted at 34 to the base 31 and the upper end of which is pivoted at 35 to the lower bracket arms 6′ of the trolley harp. The alining rod 33 extends parallel to the trolley pole 29 and inasmuch as both the pole and the rod are pivoted independently of each other to the base and the trolley harp, said parts partake of uniform movement parallel with each other and as a consequence the trolley is constantly maintained in a vertical position independent of the elevation at which it travels.

I claim:

1. In a trolley, the combination of a harp, a trolley wheel having a groove of half circle shape in cross section providing a lower bearing face for the wire and carried by said harp, a pair of carrier arms pivoted to said harp, and guard wheels having grooves of quarter circle shape in cross section and providing upper bearing faces and carried by said carrier arms and overhanging said trolley wheel and forming in connection therewith a circular opening, substantially as set forth.

2. In a trolley, the combination of a harp, a trolley wheel having a groove and carried by said harp, a pair of guard wheels arranged so as to overhang said trolley wheel, carrier posts pivoted to said harp and provided with pockets extending downwardly from their upper ends, stems seated in said pockets by which said guard wheels are carried, and which are provided with circumferential grooves, and removable keys extending transversely through said posts and seated in the circumferential grooves in said stems whereby the stems are retained in said pockets, substantially as set forth.

3. In a trolley, the combination of a harp having a hollow leg at its lower end, a trolley wheel carried by said harp, a pair of carrier arms pivoted to said harp, guard wheels journaled to said arms, a pull rod slidable in said hollow leg, toggle links having pivotal connection with said pull rod and with said carrier posts, and a coiled lift spring for surrounding said pull rod between its upper end and said hollow leg of the harp for returning the pull rod, toggle links and carrier arms to normal positions, substantially as set forth.

4. In a trolley, the combination of a harp having a pair of side arms, a shaft mounted in said side arms and provided with an oil duct, a journal sleeve carried by said shaft having a convex external surface and provided with an oil duct in communication with the oil duct in said shaft, and a trolley wheel provided with a box surrounding said journal sleeve and having interiorly thereof a concave journal surface for contact with the convex surface of said journal sleeve, substantially as set forth.

SAMUEL S. GOLDMAN.

In the presence of—
 LILY ROST,
 E. M. HARRINGTON.